Patented Mar. 16, 1937

2,073,634

UNITED STATES PATENT OFFICE 2,073,634

IMPREGNATING COMPOSITION

Olaus T. Hodnefield and Warren W. Shartel, Los Angeles, Calif.; said Shartel assignor to said Hodnefield No Drawing. Application August 7, 1930, Serial No. 473,768. Renewed August 31, 1934

7 Claims. (Cl. 134—78.6)

The present invention relates to a composition for the impregnation of exposed objects to render them immune to the destructive action of insect life, weather proof and fire-resistant.

While primarily concerned with the treatment of wood for various external and interior uses, the said treated wood is not affected by, nor has it any effect by contact upon cement or concrete plaster, or steel structures.

It is recognized that each year the loss due to the ravages of insects and fungi is terrific and governmental agencies are constantly on the watch for materials which will be preservative and at the same time inexpensive and easy of application.

Moreover, the weather proofing of wood requiring that the articles are water-resistant and likewise rendered unaffected by temperature variations constitutes a distinct problem.

This problem, of course, is applicable to structures of other materials as above set forth.

As regards a fire proof impregnating solution, it is undisputed that although there are many on the market, they do not at all times fulfill the complete requirements.

The present invention embodies a solution or composition combining all of the desirable factors outlined and which has the property of remaining stable in and upon the object to which it is applied and the further feature of not only being effective through a wide range of temperature changes, but more important, this present composition is one which apparently combines with the component structure treated and cannot be leached out by contact with water or ordinary chemical action to which the various objects, articles or building structures are subjected.

A further feature of the invention resides in the fact that it can be applied by several well known processes such as the conventional method of impregnating wood in a retort or cylinder equipped with vacuum and pressure pumps, barometric condenser and vaporizers.

The invention has as a further object the provision of a solution to which may be added suitable pigments or paints without in any wise affecting or disturbing the value of the impregnation.

The present composition may be considered as comprising two solutions, which, although preferably prepared separately, may, however, be readily prepared by a single operation.

The first solution which will be indicated for clearness, solution A, comprises certain toxic elements as follows:

|  | Pounds |
|---|---|
| Ammonium sulphate | 58 |
| Ammonium phosphate | 10 |
| Boric acid | 12 |
| Colemanite | 3 |
| Sodium fluoride | 3 |
| Carbolic acid or commercial phenol | 1 |
| Mercuric chloride or corrosive sublimate | ¾ |
| 50% solution of zinc chloride | 6 |

These ingredients are added to one hundred gallons of water which is preferably distilled, although ordinary pure water may be used. The water is poured into a mixing tank and heated to the boiling point and kept in that temperature while the various ingredients are thoroughly mixed therein and agitated to produce a solution.

The second solution which will be indicated as solution B and which has the function of a setter or sealer is formed in a solvent of aqua-ammonia, preferably a 16% solution and comprises the following ingredients:

| Barium hydroxide | 3 lbs. |
|---|---|
| Aluminum ammonium sulphate | 1 lb. |
| Tin chloride | 1 lb. |
| Copper sodium alginate | 3 lbs. |
| Benzaldehyde | 1 oz. |
| Bicarbonate of soda | 1 lb. |

These are mixed to form a solution in about one-half gallon of the ammonia solvent.

When the solution is complete, it is strained from the mixing tank into storage barrels from which it is poured in and mixed with solution A, as needed one-half gallon to each one hundred gallons of solution A, while solution A is hot and agitated.

There may be added to this sealer solution oil pigments which it has been found will remain effective in suspension in the solution.

In addition to the ingredients above referred to and particularly for very porous woods and other porous materials a solution of gum acacia or casein glue or both may be added to the sealer solution.

It will be understood that in setting forth the quantities and proportions of the various ingredients, that these will necessarily be subject to some change and variation and the figures given above have been found satisfactory in actual application, but have been departed from to a more or less degree in accordance with circumstances, so that such figures are purely representative.

The copper sodium alginate referred to will be more completely described and it will be understood that the benzaldehyde and bicarbonate of soda, as well as the pigments and gums are not fundamental ingredients.

In some cases the sealer solution or solution B may be used without recourse to solution A and likewise solution A can be used separately.

The two solutions are, however, preferably mixed and the material to be impregnated such as wood, treated in a suitable retort under pressure.

The combination of the two solutions has been found to produce a crystal in the wood which combines with the structure of the wood cells and is sealed within the cells after drying. This tends to cement the layers or cells of the material impregnated together.

The crystal is of difficult solubility and under actual tests has been found to be insoluble in hot or cold water, weak solutions of acids and alkalies. Moreover, the crystal has been tested and found heat resistant, as well as stable at low temperatures. A leaching test has been applied to articles impregnated with the solution and it has been definitely determined that upon impregnation, the crystal formed will not break down or be removed.

Wood which has been treated with the solution can be kiln dried without injury to the wood because of its being treated, nor does kiln drying affect the impregnating compound when properly done; moreover that when the cells of the wood are filled with the heat-resisting compound and dried, it prevents cracking and warping.

The activity of the treatment is such that water absorption is so substantially eliminated, that there is no tendency towards shrinking, swelling and warping. Wood and other objects do not have their tensile strength impaired.

An object such as wood, which has been impregnated with the solution, may be worked in the ordinary manner and hardly any discoloration, except where a pigment is employed to impart color, occurs.

There takes place as will be readily understood a reaction between the copper sodium alginate and the ammonia present whereby nitrocellulose is produced. Both the alginate and the nitrocellulose are present in a thin solution which allows effective penetration. When the solution dries the reaction product is sealed in the wood by reason of the evaporation of volatile solvents, and due to the presence of the copper sodium alginate, barium hydroxide, tin chloride and the nitrocellulose.

The alginate and nitrocellulose, as stated, are in a dilute or thin solution and not in colloidal state. Hence on drying, these two members are left in the wood in a concentrated state effectively sealing the reaction chemicals.

As previously indicated, various oil stains, pigments, dyes and coloring matter may be applied to the solution and satisfactorily held in suspension, so that coloration and impregnation may proceed simultaneously.

If it is desired to paint or varnish the surface after treatment, it has been found that most commercial paints and varnishes can be applied, and while such coatings may of themselves be inflammable, their contact with the impregnating compound left in the wood by the treatment will render such paints or varnishes fire-proofed.

In this connection the impregnated compound in some cases may serve as the filler usually used before painting and varnishing certain lumber and apparently has no effect upon the appearance or durability of the coating.

A feature of fundamental importance resides in the fact that the solution exerts no corrosive action in contact with metals, wood, concrete and cement structures. Although, as will be noted, some substances are employed which are inherently corrosive, nevertheless their effect is balanced by the presence of other chemicals in the solution.

As heretofore stated, our invention relates to an improved solution for rendering objects of various materials, such as wood and wood products resistant to fire, water, attacks of fungi, ravages of insects and particularly termites, powder post beetles and torredoes.

In carrying out the treatment and as illustrative of one process, in connection with lumber, it will be stated that the lumber may be that commonly known as yard green. The pieces to be treated are placed diagonally in a retort or cylinder equipped with vacuum and pressure pumps of conventional character. After steaming or vaporizing lumber under a low pressure to equalize its moisture content, a vacuum is then produced varying in accordance with the texture of the lumber and in this manner the cellulosic structure or cells of the wood are open, causing the release of some sap and moisture. This is in preparation of the wood for absorption and penetration of the treating solution upon its sides and ends. By means of a vaporizer within the cylinder, a barometric condenser, and in the presence of the vacuum, the wood is prevented from hardening, warping and shrinking during this step of the process. The treating solution heretofore described is then passed into the cylinder by means of the vacuum at a temperature varying from 75 to 125° F. until the lumber is covered. Such temperature is maintained through the medium of steam coils or other heating means within the treating cylinder or retort. A gradual pressure is then applied up to approximately 125 pounds per square inch. An average pressure is between 100 and 150 pounds varying in accordance with the texture and nature of the wood. Such pressure is maintained for a period of time governed by the thickness of the material and the penetration desired. Thereupon, the surplus fluid is withdrawn and returned to storage tanks. The lumber is thereafter partially dried by means of a slight vacuum and increased temperature. In the case of thin lumber this can be dried in a relatively short time and it will be understood that the subsequent drying can readily take place in the original treating cylinder.

Obviously this process may be departed from in favor of other known methods and the invention prove equally satisfactory.

In a test conducted, wherein lumber treated with the solution in the above manner, that is the lumber was kept under an 18 inch vacuum for thirty minutes followed by two hours in the solution at 120 pounds pressure with a temperature range from 65° F. and thereafter the lumber kiln dried to 10% moisture, it was found that the impregnation remains stable and active when the lumber was subjected to the following conditions.

The treated lumber was subjected for three and one-half hours to a vacuum ranging from 0 to 20 inches, with maximum vacuum duration of one-half hour periods in three cycles under steam baths ranging from 140° to 230° F., and finished with a hot water bath of an hour at a temperature of 150° F. maximum. As a result of this test, it was found that there resulted no extraction of the impregnating solution and clearly indicating that the wood so treated would not be subject to ordinary conditions of moisture and temperature since the impregnating solution stood up against such powerful leaching action.

The wood treated in the above manner has been found to exhibit exceptional fire-proof qualities. For example, a sample of fire-proof wood that had been completely impregnated, was deposited in a steel blast furnace under the full blast of 2800° F., and was allowed to remain therein for three and one-half minutes. Upon removal the sample showed evidence of charring only $\frac{1}{16}$ of an inch into the surface of the wood.

This original piece was split and a triangular section with the center section uncharred was replaced in the furnace under similar conditions for nine and one-half minutes. When removed, it showed evidence of charring only $\frac{3}{8}$ of an inch into the surface of the wood.

In each case the wood failed to sustain a flame upon removal from the furnace, and it was readily possible to hold and handle the samples within forty-five seconds after removal, indicating clearly that there is no factor of heat conductivity in the impregnated material, and that the completely impregnated wood will not carry a flame when removed from the furnace.

It was also developed upon test that the solution renders wood and wood products immune from attacks of fungi and insect life.

Furthermore, the test developed that the impregnating solution does not increase the electrical conductivity of the wood, but, on the other hand, adds to the structural strength of the material which is treated. This to some extent appears to be due to the sealer or solution B which retains the impregnating compound in the cells of the wood, preventing any possibility of its leaching out and under most leaching conditions the action of the leaching solution whether it be water or chemical compounds has appeared to merely set or seal the impregnating composition of this invention firmer into the wood with each attempt at leaching.

It will be understood that various degrees of penetration may be resorted to and that the solution itself possesses unusual penetrating powers. It is desirable, of course, to insure complete impregnation, but obviously such action may be controlled to any required depth. In treating, volumetric absorption is desired which, of course, would have a greater effect on porous woods than on those of a more dense nature.

The combination of chemicals heretofore set forth produces a crystal which is sealed within the cells of the wood after drying and after treatment the constancy of the treating solution thus becomes fixed in the wood and is not subject to leaching by means of water or other substances, nor is the impregnated product subject to evaporation.

Instead of using ammonium sulphate in solution A, we may substitute magnesium carbonate using approximately 25 pounds and in lieu of ammonium phosphate, phosphoric acid may be employed in the approximate quantity of 20 pounds.

We have found, however, that ammonium sulphate and ammonium phosphate are preferable in the interest of fire resistance and particularly so when used with boric acid and colemanite. Colemanite acts as a fire retardent and, moreover, when combined with solution B, is active in the production of the insoluble crystal. The carbolic acid acts to promote or accelerate chemical combination, as well as to increase the penetration powers of the solution and is a toxic member. The sodium fluoride acts to change the contents of the wood and is likewise a toxic compound.

The mercuric chloride assists in producing the insoluble crystal and is a toxic substance. The tin chloride, like the mercuric chloride, acts to render solution B insoluble under all weather conditions and is also a preservative for the wood and has the added characteristic of being toxic. With respect to solution B, when it is combined with solution A and applied to an object which is then dried, an insoluble compound or mixture is produced which is unaffected by water and acids and alkalies as heretofore stated. The barium hydroxide aids in maintaining solution B insoluble and acts as a fire retardent. The aluminum ammonium sulphate promotes the solvent action when solutions A and B are combined and is likewise a fire retardent. The tin chloride appears to reinforce the sealer solution and the crystal produced and is toxic.

The bicarbonate of soda has the function of a neutralizing agent to prevent corrosion.

The copper sodium alginate in combination with the above ingredients has the effect of a stabilizer and renders the wood or other substance treated with the solution completely weather proof. In other words, the alginate prevents a breaking down of the crystal in the presence of moisture or varying temperature conditions.

It will be understood that sodium fluoride, mercuric chloride and zinc chloride may be eliminated from solution A.

Likewise, aluminum ammonium sulphate is not essential in solution B, nor is the use of a deodorant such as benzaldehyde.

Where these compounds are eliminated treatment with the solution has been found effective, since the sap and sugar contents are so altered that ravaging organisms cannot subsist in the presence of the insoluble sugar and cellulosic structure. It will be understood that the elimination of the several compounds is not contemplated, but will not substantially affect the value of the solution, since in any event the sap and sugar contents of the wood are converted into new compounds by reason of the metallic elements present in the solution and are rendered insoluble by the action of solution B.

In referring to the use of ammonia as the solvent for the sealer solution, it will be understood that other suitable solvents may be employed, although ammonia has been found satisfactory for keeping all ingredients in solution while the penetrating process is being conducted.

During drying by means of vacuum and heat or other process, any water, as well as the volatile ammonia will be driven out or evaporated leaving only the insoluble compound of the present invention.

As has been heretofore recited, the sealer solution indicated as solution B may be used separately and there may be added to this solution various of the substances of solution A, either for their toxic qualities or their fire retardent characteristic, it being necessary, however, that such ingredients be capable of dissolution in the sealer solution or in water. In other words, such of the ingredients or other equivalent materials may be employed which after impregnation in drying will produce the insoluble crystal or impregnation product.

With further reference to the sealer, it will be understood that the proportions given can be altered, so as to maintain a sufficient pH required to stabilize the various compounds in the solution. In the application of the sealer, portions of the wood, for instance the sugar, and sap and the pitch content are dissolved in the solution and are made insoluble by the impregnating solution and the lumber or other object is dried.

As heretofore stated, the use of a deodorant and neutralizer in the sealer composition are desirable, but are not fundamentally necessary.

We have determined that the specific gravity of solution A is substantially 1.092, while that of solution B is 2.16 and the specific gravity of the combination is 1.0926. The actual specific gravity of the two is about 1.055, the latter being due to chemical reaction taking place when the solutions are mixed.

Solution A, as heretofore stated, is prepared in heated condition, while solution B is mixed while cold, but should be added to solution A while the latter is heated, the temperature in either case being substantially 100° F.

In this connection when solutions A and B are mixed, it is desirable to maintain a pressure of about 150 pounds at a temperature of 100° F. After a sufficient time, the complete solution becomes stabilized and may then be cooled and stored and there will be no later settling. This is true also where oil pigments or other coloring materials have been added.

It will be understood that the preparation of solution A may be in the form of separate solutions of each of the ingredients or the ingredients may be prepared dry and added to the hot water.

It will be observed that as a fundamental ingredient of the sealer, an alginate solution is employed. Preferably copper sodium alginate is utilized and in order to produce an effective solution, we make use of the ammonium hydroxide solvent described in connection with the sealer solution indicated as solution B. We find that ammonium hydroxide will keep the sealer solution stable until drawn off or evaporated, whereupon the metallic salts also forming part of the sealer solution will produce on drying, an insoluble crystal or impregnating compound. As stated, the ammonium is driven off together with the water during the subsequent drying process.

The copper sodium alginate employed is prepared by removing all water soluble substances from the kelp by repeated washings and macerations. The remaining fibrous substance is placed in a solution of 15% copper sulphate for twenty-four hours and then removed to a bath of 15% sulphuric acid for about twelve hours, thereby producing copper alginate. This alginate is brought into contact with sodium carbonate and transformed into a solution by the addition of ammonium hydroxide. The other metallic salts referred to in the sealer solution, as well as the various ingredients of solution A may be added, the metallic salts upon drying acting primarily to render the alginate insoluble and to render the sap and sugar contents of the wood likewise insoluble and immune to the possibility of fungi and insect action. It appears that the alginate unites chemically with the other ingredients to produce the fire retardent and to seal such fire retardent chemical in the wood. Moreover, the alginate acts to prevent leaching or a breaking down of the chemical compound under various conditions. This is due to the fact that the alginate after drying becomes insoluble in water, weak alkalies or acids and remains unaffected through various temperature changes. The alginate apparently acts to stabilize and maintain all of the other chemical members of the solution insoluble and stable.

The alginate as described forms the basis for the sealer or setter and maintains intact the fire retardent, water proof and toxic constituents. It will be understood that there is some apparent combination with the wood when the solution is applied and with the sap and sugar of the wood, such chemical union contains the toxic members and in this manner renders the particular object treated immune to insect organisms.

The barium hydroxide, aluminum ammonium sulphate, tin chloride and bicarbonate of soda have the effect of further inducing insolubility to the alginate after drying, as well as exerting a toxic and fire-retardent quality.

Benzaldehyde apparently forms a chemical union and assists penetration.

The bicarbonate, as heretofore set forth, acts as a neutralizer and maintains the sealer neutral.

Solution A serves to augment the fire-retardent, preservative and toxic qualities of solution B, but it will be understood, as has been heretofore stated, that various members of solution A may be added separately to solution B or equivalent fire-retardent or toxic members may be used in combination with solution B.

Likewise, solution B may be used as herein described without recourse to other compounds or solutions having of itself the quality of forming an insoluble crystal upon drying, which crystal will retain a lower, but all of the active principles of the toxic, fire-retardent and moisture and temperature resisting principles of the solution.

With respect to solution A, the first two members act as fire-retardents and also retard bug and fungi invasion. These members are rendered insoluble when combined with solution B, upon drying.

The boric acid and colemanite likewise serve as fire-retardents and act as a neutralizer against corrosive chemicals, and are a preserver of the wood or other material treated or impregnated. These two members likewise retard bug, insect and fungi invasion. Sodium fluoride acts as a poison against bugs and insects and helps to render the sap and sugar contents of wood poisonous to destructive animal and insect organisms.

Phenol, as described, accelerates penetration and retards bug and fungi action. The mercuric chloride and zinc chloride are rendered insoluble when the solution is dried and have a preservative action upon the article treated. These two members are likewise poisonous to insect organisms and fungi.

While we have set forth a number of materials possessing in both solution A and solution B, as well as the combined solution, the properties are being fire resistant, moisture and temperature resistant and toxic, it will be understood that various equivalent substances may be substituted. It will, moreover, be understood that the final product of this invention is an insoluble crystalline material which will retain its stability against all of the active forces of fire, temperature, water and resist the ravages of bugs and fungi and that primarily the crystal cannot be leached out as shown by the most severe test. Moreover, the crystal has the property of combining, for example, with the cellulose structure of the wood and when drying of retaining the various compounds of the solution insoluble, while at the same time permitting them to exercise their active functions and principles. It has been determined that the action of solution B or solutions A and B effects what may be considered a chemical reaction with the wood to the end that an insoluble chemical compound is formed having all of the properties of the crystal and its components, being particularly resistant to fungi and insect organisms.

It will be observed that aluminum ammonium sulphate is water-solvent and has a tendency to attract moisture, but when it is combined with barium hydroxide, which is not water-solvent, but soluble in the ammonium solution and does not have a tendency to attract moisture, this tendency is overcome. The crystal, however, was not adhesive, but brittle and easily powdered, and in order to add adhesive qualities the copper sodium alginate is employed, since it was found to be sufficiently adhesive and also rendered the salts water resistant. Likewise, the copper sodium alginate assisted the barium hydroxide and aluminum ammonium sulphate in forming a compound which would have the effect of cementing the cells of the wood together.

It was, furthermore, found that tin chloride would strengthen the crystal and prevent its powdering and, although metallic, it would not injure tools which might be used in finishing the wood. As has heretofore been set forth, when solutions A and B are combined, they are preferably subjected to temperature and pressure, and thereafter cooled. In this manner, any possibility of settling is prevented and the solution may be stored indefinitely.

So far as the use of benzaldehyde and bicarbonate of sodium are concerned, these are only employed where it is found that the solution may be corrosive or possesses an odor. These two materials may be added as a part of solutions A or B, or obviously a combination.

The sealer solution or solution B may be employed in connection with many known solutions which are fireproof and insect and fungi resistant. In other words, solution B may be mixed with various other well known solutions having toxic, fire resistant and moisture and temperature resistant properties. The final result in each case is the formation of an insoluble compound having the property of maintaining insoluble the various ingredients and compounds, while at the same time permitting them to exercise their full active principles. At the same time, the crystal or composition formed upon the object impregnated after drying is substantially immune from leaching or powdering.

The present invention, therefore, overcomes customary undesirable results occasioned by leaching, the use of metallic salts and corrosive chemicals. With respect to metallic salts, there has been considerable attention paid to this subject and the principal objection appears to be that the wood so impregnated cannot be properly worked. With the present invention, this disadvantage is obviated.

With corrosive chemicals, it has been difficult to neutralize and at the same time not injure the properties of the particular chemical. Such corrosive chemicals have, moreover, had the effect of injuring the metal specifically nails and also attacking the wood after a short period of time. Such a result is not possible with the present invention.

There has also always been a difficulty in forming the solutions, much agitation being required to maintain the ingredients in suspension. The present invention overcomes this difficulty by providing a solution which is so prepared that it remains stable indefinitely. Moreover, the present compound will take paint, varnishes and pigments after impregnation and drying, or these may be added as a part of the solution.

It will be understood that the insoluble crystal or compound produced combines with the structure impregnated, and likewise is sealed within the cells or pores of the object and, at the same time, maintains all of the active principles of the ingredients insoluble, permitting them to exert their function. The crystal, however, cannot be leached out under usual conditions.

We claim:

1. An impregnating composition, comprising the reaction product of a solution of ammonium sulphate, ammonium phosphate, boric acid, colemanite, sodium fluoride, carbolic acid, mercuric chloride, zinc chloride, barium hydroxide, aluminum ammonium sulphate, tin chloride and copper sodium alginate.

2. The process of producing an impregnating composition comprising forming a solution of ammonium sulphate, ammonium phosphate, boric acid, colemanite, sodium fluoride, carbolic acid, mercuric chloride, zinc chloride, barium hydroxide, aluminum ammonium sulphate, tin chloride and copper sodium alginate, subjecting the solution to a pressure and temperature of substantially 150 lbs. at 100° F., and cooling the solution.

3. An impregnating composition comprising the reaction product of a solution of ammonium sulphate, ammonium phosphate, boric acid, colemanite, phenol, barium hydroxide, tin chloride, an alginate, and ammonia.

4. An impregnating composition comprising the reaction product of a solution of ammonium sulphate, ammonium phosphate, boric acid, colemanite, sodium fluoride, carbolic acid, mercuric chloride, zinc chloride, barium hydroxide, aluminum ammonium sulphate, tin chloride, copper sodium alginate and benzaldehyde.

5. An impregnating composition comprising the reaction product of a solution of ammonium sulphate, ammonium phosphate, boric acid, colemanite, sodium fluoride, carbolic acid, mercuric chloride, zince chloride, barium hydroxide, aluminum ammonium sulphate, tin chloride, copper sodium alginate, benzaldehyde and bicarbonate of soda.

6. The process of producing an impregnating composition comprising forming a solution of ammonium sulphate, ammonium phosphate, boric acid, colemanite, sodium fluoride, carbolic acid, mercuric chloride, zinc chloride, barium hydroxide, aluminum ammonium sulphate, tin chloride, copper sodium alginate and benzaldehyde, subjecting the solution to a pressure and temperature of substantially 150 lbs. at 100° F., and cooling the solution.

7. The process of producing an impregnating composition comprising forming a solution of ammonium sulphate, ammonium phosphate, boric acid, colemanite, sodium fluoride, carbolic acid, mercuric chloride, zinc chloride, barium hydroxide, aluminum ammonium sulphate, tin chloride, copper sodium alginate, benzaldehyde and bicarbonate of soda, subjecting the solution to a pressure and temperature of substantially 150 lbs. at 100° F., and cooling the solution.

OLAUS T. HODNEFIELD.
WARREN W. SHARTEL.